United States Patent Office 2,851,479
Patented Sept. 9, 1958

2,851,479

PRODUCTION OF 2-CYANOETHOXYETHANOL

John W. Lynn, Charleston, W. Va., assignor to Union Carbide Corporation, a corporation of New York No Drawing. Application February 27, 1956
Serial No. 567,712

10 Claims. (Cl. 260—465.6)

This invention relates to chemical processes. More particularly it is directed to an improvement in processes for the production of 2-cyanoethoxyethanol.

It has been suggested to make 2-cyanoethoxyethanol by the cyanoethylation of ethylene glycol, that is by the reaction of acrylonitrile with ethylene glycol. One of the outstanding disadvantages of such a process is the formation, along with the desired 2-cyanoethoxyethanol, of the dicyanoethylated compound resulting from the reaction of two molecules of acrylonitrile with a molecule of ethylene glycol, leaving a substantial proportion of the ethylene glycol unreacted.

The present improvement is based on my discovery that 2-cyanoethoxyethanol can be produced substantially free of troublesome side reaction products and consecutive reaction products by reacting ethylene cyanohydrin with ethylene oxide. The reaction that takes place may be represented by the following equation.

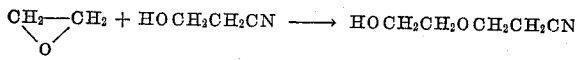

It is an essential feature of my process that in carrying out the reaction the amount of unreacted ethylene oxide present in the reaction mixture at any time shall not exceed the amount stoichiometrically required for reaction with all of the ethylene cyanohydrin present therein, mol for mol. In a preferred embodiment of the process it is likewise an essential feature that the amount of ethylene cyanohydrin present in the reaction mixture shall at all times be in excess of that stoichiometrically required for reaction with all of the unreacted ethylene oxide present therein. That is to say, there must always be at least 1.1 mol of unreacted ethylene cyanohydrin present in the reaction mixture per mol of unreacted ethylene oxide.

The process of my invention can be carried out either batchwise or continuously. The reactants can be charged to the reactor vessel either separately or in admixture with one another. They may either be charged at the start of the process or one or more of the reactants may be charged during the course of the reaction as may be required. For instance, in a batchwise operation, if desired, the ethylene cyanohydrin can be charged to a reactor and the ethylene oxide introduced into the reaction mixture by a sparger or other suitable means. The reactor can be a vessel provided with a column, or, if the reaction is to be carried out under pressure, the reactor can be a bomb-type vessel provided with means for introducing the reactants. For continuous operation the reactor can be a pipe or conduit, if desired.

The temperature as which the process can be carried out is not narrowly critical. By way of illustration, the process can be carried out at temperatures ranging from 40° C. to 200° C., whereas the preferred temperature range is from 60° C. to 180° C. At temperatures below 60° C. the rate of reaction is undesirably slow in most cases. Although temperatures above 180° C. can be employed if desired, no commensurate advantage is obtained thereby. Temperatures above 200° C. are not recommended.

Similarly, the pressures at which the process can be carried out are also not critical. Thus pressures up to 1000 pounds per square inch gauge or more can be employed with good results while a pressure of about 150 pounds per square inch gauge is recommended for many embodiments of the invention. The process can also be carried out at atmospheric pressure. However, the use of pressures above atmospheric pressure favors a higher rate of reaction. As an aid in providing the desired super-atmospheric pressure, a gas which is non-reactive in the reaction mixture, can be introduced into the reaction vessel. Suitable gases include nitrogen, methane, propane, butane, any of the inert gases and the like.

A catalyst may also be employed to favor a higher rate of reaction, if desired. At the lower temperatures and pressures the presence of a catalyst is especially beneficial. A basic catalyst is preferred, of which the following are illustrative; the oxides, hydroxides, alcoholates and basic reacting salts of the alkali metals lithium, sodium, potassium, rubidium and cesium, and the alkaline earth metals calcium, strontium and barium. Acidic and weakly basic materials may also be employed as catalysts, if desired, but in such cases higher temperatures and pressures will also be found desirable.

A reaction time of from 1 to 24 hours will ordinarily suffice for reaction of all of the ethylene oxide. The presence of a catalyst will shorten the time necessary for the reaction, as will the use of a higher temperature.

In one preferred embodiment of my invention ethylene oxide is reacted with ethylene cyanohydrin in the presence of from 1.5 to 3 mols of unreacted cyanohydrin per mol of unreacted ethylene oxide. A temperature of from 140 to 150° C. and a pressure of about 150 pounds per square inch gauge are preferred. Preferably a non-reactive gas, such as butane or the like, is present in the quantity necessary to achieve the desired pressure. The reaction proceeds rapidly under these conditions without the necessity of a catalyst.

In another preferred embodiment of my invention the reaction is carried out at atmospheric pressure and in the presence of an alcoholate of an alkali metal as catalyst, such as sodium methylate or sodium ethylate. From 1.5 to 3 mols of unreacted ethylene cyanohydrin per mol of unreacted ethylene oxide are present during the course of the reaction. The temperature of the reaction can be from 40° C. to 80° C., with about 60° C. preferred. The preferred catalyst concentration is from 0.1 to 1 part by weight of catalyst per part of ethylene cyanohydrin.

In yet another preferred embodiment of my invention the reaction is carried out in the presence of a basic reacting salt of an alkali metal as catalyst, as for example sodium acetate. From 1.5 to 3 mols of unreacted ethylene cyanohydrin per mol of unreacted ethylene oxide are present during the course of the reaction. The temperature of the reaction can be from 130° C. to 160° C., with about 145° C. preferred. A pressure of about 150 pounds per square inch guage is preferred, and the preferred catalyst concentration is from 0.1 to 1 part by weight of catalyst per part of ethylene cyanohydrin.

The following examples illustrate the invention but do not limit it to less than what is claimed.

*Example I*

Seven mols of ethylene cyanohydrin were charged into a jacketed reactor column and 5.7 mols of ethylene oxide were slowly sparged into the bottom of the reactor. The reactor column was heated and at a temperature between 150 and 160° C. reaction took place at a slow rate. After a total reaction time of about twenty hours the reaction product mixture was distilled under reduced pressure to yield 90 grams of 2-cyanoethoxyethanol for a yield of 13.4 percent based on ethylene oxide.

*Example II*

Twelve mols of ethylene cyanohydrin and 15 grams of butane were charged into a 3 liter stainless steel bomb and placed under a pressure of 50 pounds per square inch gauge by the addition of ethylene oxide. The charge in the bomb was slowly heated until a rapid reaction commenced at a temperature between 150 and 160° C. This temperature and a pressure of 150 pounds per square inch gauge were maintained while more ethylene oxide was added until a total of 6 mols of ethylene oxide had been added to the bomb. After the reaction was complete which required a total of about four hours, the reaction mixture was flash distilled at a temperature of 200° C. and a pressure of 6.5 mm. of mercury and then redistilled to give 283 grams of 2-cyanoethoxyethanol for a yield of 41 percent based on ethylene oxide.

*Example III*

Six mols of ethylene cyanohydrin, containing 0.5 percent by weight of sodium methylate as catalyst, were charged into a jacketed glass column reactor and heated to a temperature of 60° C. A total of 1.7 mols of ethylene oxide were sparged into the bottom of the reactor over a period of 6 hours. The reaction product mixture was then acidified with sulfuric acid and distilled under reduced pressure to give 72 grams of 2-cyanoethoxyethanol for a yield of 37.3 percent based on ethylene oxide.

*Example IV*

Twelve mols of ethylene cyanohydrin containing 0.5 percent by weight of sodium methylate as a catalyst, and 15 grams of butane were charged into a 3 liter stainless steel bomb and placed under a pressure of 50 pounds per square inch gauge by the addition of ethylene oxide. The bomb was slowly heated until at a temperature of the reaction mixture between 80 and 100° C. a rapid and exothermic reaction commenced. Heating was continued and a temperature of 150° C. and a pressure of 150 pounds per square inch gauge were maintained while additional ethylene oxide was fed into the bomb until a total of 6 mols of ethylene oxide had been added. After completion of the reaction, which required a total of about three and one-half hours, the reaction product mixture was acidified with sulfuric acid and then flash-distilled at a temperature of about 200° C. and at a pressure of 4–5 mm. of mercury. Redistillation gave 132 grams of 2-cyanoethoxyethanol for a yield of 19 percent based on ethylene oxide.

*Example V*

Twelve mols of ethylene cyanohydrin, containing 0.5 percent by weight of sodium acetate as catalyst, and 15 grams of butane were charged into a 3 liter stainless steel bomb and placed under a pressure of 50 pounds per square inch gauge by the addition of ethylene oxide. The bomb was slowly heated until at a temperature of the reaction mixture between 140 and 150° C. a rapid reaction commenced. This temperature and a pressure of 150 pounds per square inch gauge were maintained while additional ethylene oxide was fed into the bomb until a total of 6 mols of ethylene oxide had been added. After completion of the reaction, which required a total of about two and one-half hours, the reaction product mixture was acidified with sulfuric acid and then flash-distilled at a temperature of about 198° C. and at a pressure of 6 mm. of mercury. Redistillation gave 303 grams of 2-cyanoethoxyethanol for a yield of 44 percent based on ethylene oxide.

What is claimed is:

1. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide.

2. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at a temperature of from 60° C. to 180° C.

3. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, under a pressure of from atmospheric pressure up to 1000 pounds per square inch gauge.

4. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, in the presence of a basic catalyst.

5. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at a pressure of about 150 pounds per square inch gauge and at a temperature of about 150° C.

6. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at about atmospheric pressure, at a temperature of about 60° C. and in the presence of a catalytic amount of an alcoholate of an alkali metal.

7. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at about atmospheric pressure, at a temperature of about 60° C. and in the presence of a catalytic amount of sodium methylate.

8. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at about atmospheric pressure, at a temperature of about 60° C. and in the presence of a catalytic amount of sodium ethylate.

9. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at a pressure of about 150 pounds per square inch gauge, at a temperature of about 145° C. and in the presence of a catalytic amount of a basic-reacting salt of an alkali metal.

10. A process for making 2-cyanoethoxyethanol which comprises reacting ethylene oxide with ethylene cyanohydrin in a reaction mixture containing more than one mol of unreacted ethylene cyanohydrin per mol of unreacted ethylene oxide, at a pressure of about 150 pounds per square inch gauge, at a temperature of about 145° C. and in the presence of a catalytic amount of sodium acetate.

References Cited in the file of this patent

UNITED STATES PATENTS

| | | |
|---|---|---|
| 2,390,519 | Davis et al. | Feb. 16, 1939 |
| 2,403,686 | Schwoegler | July 9, 1946 |

OTHER REFERENCES

Zimakov et al.: Chem. Abst., vol. 30, col. 7540 (1936).
Ishiguro et al.: Chem. Abst., vol. 45, col. 2862 (1951).